W. V. TURNER.
BRAKE CYLINDER PRESSURE REGULATOR.
APPLICATION FILED MAY 12, 1916.
1,265,004.
Patented May 7, 1918.
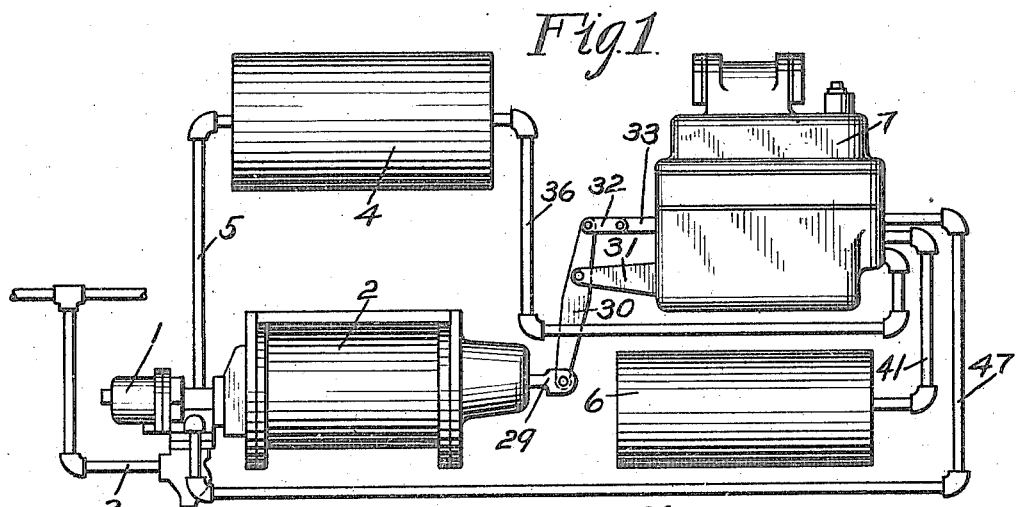
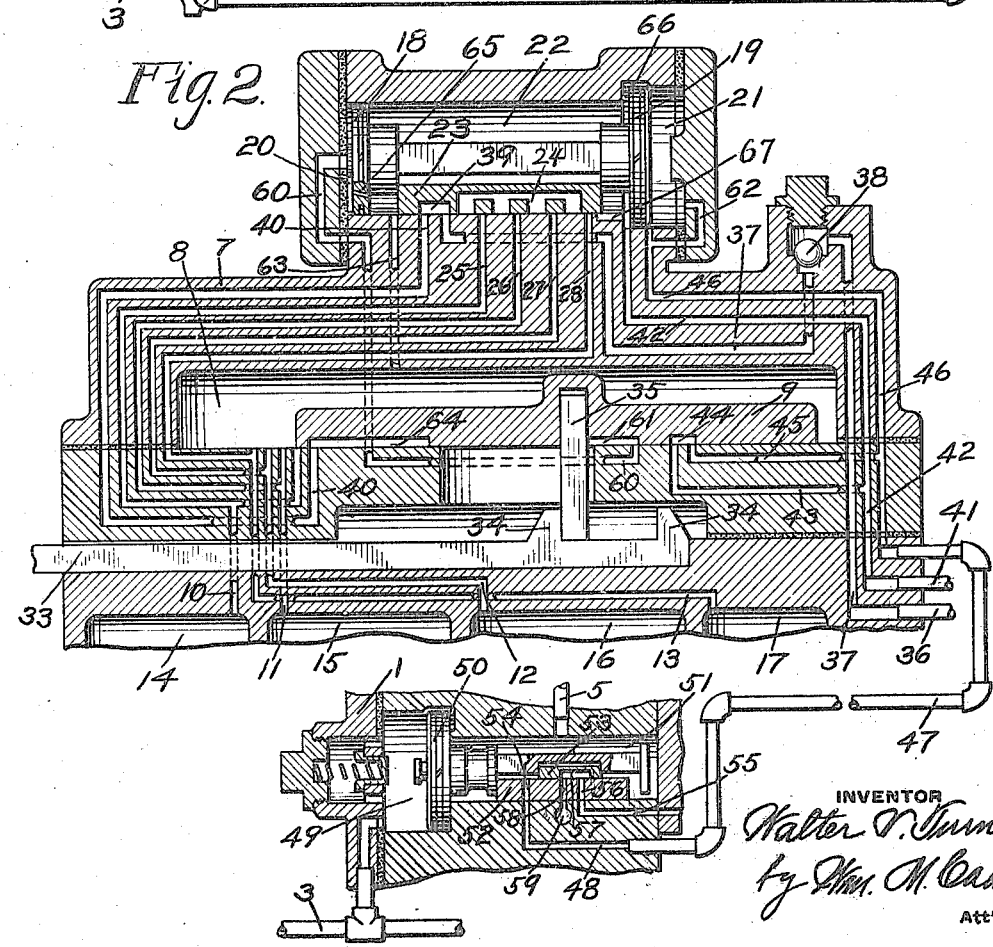
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CYLINDER-PRESSURE REGULATOR.

1,265,004.     Specification of Letters Patent.     Patented May 7, 1918.

Application filed May 12, 1916. Serial No. 96,998.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Cylinder-Pressure Regulators, of which the following is a specification.

This invention relates to fluid pressure brakes, and more particularly to a device for regulating the auxiliary reservoir volume according to the brake cylinder piston travel, the present invention being in the nature of an improvement on the construction covered by my Patent No. 1,194,442, dated August 15, 1916.

When a so-called two-application stop is made, the fluid in the brake cylinder is usually not fully released between the two applications, so that in making the second application of the brakes, the brake cylinder pressure will be higher per pound of brake pipe reduction than would be the case in an initial application, since the pressure due to the brake pipe reduction is added to that already contained in the brake cylinder and the result is a heavy brake application at a time when it is ordinarily not desired.

The above is particularly true of the construction covered by the above mentioned prior patent application, in which as the brake cylinder piston travel increases, volume compensating chambers are connected to the auxiliary reservoir.

The principal object of my invention is to provide means for limiting the brake cylinder pressure produced in the second application of the brakes when a two application stop is made.

Other objects and advantages will appear in the following more detailed description of the invention.

In the accompanying drawing; Figure 1 is a diagrammatic view of a car air brake equipment, showing applied thereto, a brake cylinder pressure regulating device embodying my invention, and Fig. 2 a fragmentary sectional view of the pressure regulating device and the triple valve device of the air brake equipment.

The car equipment may comprise a triple valve device 1, a brake cylinder 2, a brake pipe 3, an auxiliary reservoir 4 connected to the triple valve device 1 by pipe 5, a supplemental reservoir 6, and a pressure regulating valve device 7.

According to my present invention, the brake cylinder pressure regulating device 7 may comprise a casing having a valve chamber 8, containing a slide valve 9 for controlling communication from chamber 8 through the respective passages 10, 11, 12, and 13 to chambers 14, 15, 16, and 17.

There is also contained within the casing a differential piston device having piston heads 18 and 19 contained within the respective piston chambers 20 and 21 and having a valve chamber 22 intermediate the piston heads containing a slide valve 23 having a cavity 24 adapted in one position of the differential piston device to connect together passages 25, 26, 27 and 28, leading respectively to passages 10, 11, 12, and 13.

The slide valve 9 is adapted to be operated by the movement of the brake cylinder piston and for this purpose, the brake cylinder piston rod 29 is connected to a lever 30, fulcrumed on an arm 31, and the opposite end of the lever 30 is connected through links 32 to a bar 33 slidably mounted within the casing 7.

The inner end of the bar 33 is provided with spaced stops 34 adapted to engage a pin 35 carried by the slide valve 9 and extending through an opening in the slide valve seat.

The auxiliary reservoir 4 is connected by pipe 36 to a passage 37 in the device 7 which leads to the seat of slide valve 23 and contains a check valve 38. In the normal position of the slide valve 23, a cavity 39 connects passage 37 with a passage 40 leading to the seat of slide valve 9.

The supplemental reservoir 6 is connected by a pipe 41 to a passage 42 having a branch passage 43 leading to the seat of slide valve 9. In the release position of the slide valve 9, as shown in the drawing, a cavity 44 connects passage 43 with a passage 45 leading to a passage 46, which opens into the piston chamber 21 and is also connected by a pipe 47 to a passage 48 in the triple valve device 1.

The triple valve device 1 may comprise a casing having a piston chamber 49 containing a piston 50 and a valve chamber 51 connected to auxiliary reservoir 4 through pipe 5 and containing a main slide valve 52 and a graduating valve 53 adapted to be operated by piston 50.

The passage 48 is the usual quick recharge and graduated release passage and in release position is connected by port 54 with valve chamber 51, the brake cylinder passage 55 being connected by port 56, cavity 57 in graduating valve 53 and port 58 to exhaust port 59.

In operation, when the brake system is being charged with fluid under pressure, fluid flows from the brake pipe 3 to the piston chamber 49 of the triple valve device and thence through the usual feed groove around the triple valve piston 50 to valve chamber 51, charging the auxiliary reservoir 4 and fluid at the same time flows through the port 54 and passage 48 to pipe 47 and passage 46 in the pressure regulating valve device 7.

The brake cylinder piston being now in release position, the bar 33 maintains the slide valve 9 in the position shown in Fig. 2 of the drawings, in which a passage 60 leading to piston chamber 20 of the small piston head 18 is connected by a cavity 61 in the slide valve 9 with the atmosphere.

A by-pass 62 leads from passage 46 to the outermost portion of piston chamber 21, so that the outer face of piston 19 will always be subject to the pressure of fluid supplied through passage 46, and it will thus be seen that when fluid is supplied from valve chamber 51 to passage 46, the fluid pressure can build up on the outer face of piston head 19 regardless of its position, and since the piston head 18 is now subject to atmospheric pressure, the differential piston device will be shifted to the left, if not already in that position.

Fluid is supplied from the supplemental reservoir 6 through pipe 41 and passage 42 to valve chamber 22 and from said valve chamber through a passage 63 to valve chamber 8.

In the release position of slide valve 9, the passages 10, 11, 12, and 13 are open to valve chamber 8, so that the chambers 14, 15, 16, and 17 are charged with fluid under pressure and the supplemental reservoir 6 is charged from passage 46, through passage 45, cavity 44, passage 43, and passage 42.

If an application of the brakes is effected, the brake cylinder piston is moved out in the usual manner and the lever 30 then actuates the sliding bar 33. The space between the stops 34 is arranged so as to permit a certain brake cylinder piston travel, say for example, five inches, before the right hand stop 34 will engage the pin 35 and consequently, for this minimum piston travel no change in the position of slide valve 9 occurs and the brake cylinder pressure obtained per pound of brake pipe reduction will be proportioned to the volume of the auxiliary reservoir 4.

If in applying the brakes, the brake cylinder piston moves out beyond the minimum brake cylinder piston travel, say to six inches, then the pin 35 will be operated by the bar 33 so as to connect the passage 10, through cavity 64 with passage 40, so that the volume of the charged chamber 14 will be cut into communication with the auxiliary reservoir 4, and thus the brake cylinder pressure per pound of brake pipe reduction will correspond with the combined volumes of the auxiliary reservoir 4 and chamber 14, thus compensating for the increased brake cylinder piston travel. In a like manner, as the brake cylinder piston travel in increased, the slide valve 9 moves to successively cut in the chambers 15, 16, and 17, so as to automatically compensate for the successive increases in brake cylinder volume.

In releasing after a brake application, the triple valve piston is moved to released position in the usual manner by the increase in brake pipe pressure and fluid from the brake cylinder starts to exhaust through exhaust port 59 but it is evident that the slide valve 9 will not be moved back to release position until the brake cylinder piston moves to release position, so that at first, in releasing, the passage 60 is still lapped by slide valve 9, permitting the piston chamber 20 to remain charged with fluid supplied from valve chamber 22 through the equalizing port 65. The fluid pressure in piston chamber 21, however, is reduced by flow through by-pass 62, passage 46, pipe 47, passage 48 and port 54, to valve chamber 51, since the auxiliary reservoir pressure will be lower than supplemental reservoir pressure after a brake application.

This reduction in pressure in piston chamber 21 is greater than can be compensated for by flow through feed groove 66, so that the unbalanced pressure then causes movement of the differential piston device to the right.

The movement of slide valve 23 then cuts off communication from the auxiliary reservoir to the compensating chambers, so that when the slide valve 9 moves back to release position with the brake cylinder piston, fluid under pressure in any compensating chambers which have not been cut in with the auxiliary reservoir in applying the brakes, will not equalize back into the auxiliary reservoir and thus unduly increase the auxiliary reservoir pressure, such increase in auxiliary reservoir pressure tending to cause an undesired reapplication of the brakes.

The usual recharge of the auxiliary reservoir from the supplemental reservoir, however, is not interfered with, for although the slide valve 9 is in a position blanking the passages 43 and 45, the piston head 19 of the differential piston being in its outer position, communication is established between passages 42 and 46, so that fluid can flow from the supplemental reservoir to the auxiliary reservoir through pipe 47 and passage 48.

Another important result of cutting off the compensating chambers from the auxiliary reservoir in releasing the brakes is incident to the making of a so-called two application stop. In the case of a two application stop, the time between the two applications is usually so short, that the fluid in the brake cylinder is not fully released, so that the brake cylinder piston remains out and since the slide valve 9 is also held in its outer position, the passage 60 is kept closed, and consequently the differential piston device will remain in its outer position, in which the compensating chambers are cut off from the auxiliary reservoir.

It will now be seen that when the second application of the two application stop is made, since the compensating chambers are cut off from the auxiliary reservoir, the rise in brake cylinder pressure per pound of brake pipe reduction will only be such as can be obtained from the original auxiliary reservoir volume, which of course would be less than normal.

If an emergency application of the brakes is made, fluid is supplied from the supplemental reservoir to the auxiliary reservoir in the manner heretofore employed in order to obtain a high brake cylinder pressure. With the present construction, since the supplemental reservoir pressure is reduced in an emergency application of the brakes by flow to the brake cylinder, the pressure in piston chamber 21 will also be reduced, so that the differential piston device will be shifted to its outer position.

In order to prevent the bottled up pressure in the compensating chambers from lifting the slide valve 23 off its seat, a groove 67 is provided in the slide valve seat which connects the passages leading to the compensating chambers, through cavity 24 with valve chamber 22, so that the pressures in said chambers will equalize down with the supplemental reservoir pressure.

Having now described my invention, what I claim as new and desire to secure by Letters Patent, is:

1. In a fluid pressure brake, the combination with an auxiliary reservoir from which fluid is supplied to effect an application of the brakes, of means controlled by the brake cylinder piston travel for cutting in additional volume to the auxiliary reservoir and means operated upon effecting a release of the brakes for cutting off said volume from the auxiliary reservoir.

2. In a fluid pressure brake, the combination with an auxiliary reservoir from which fluid is supplied to effect an application of the brakes, of chambers normally charged with fluid under pressure, a valve mechanism controlled by the brake cylinder piston travel for connecting said chambers to the auxiliary reservoir, and means operating in releasing the brakes for cutting off communication from said chambers to the auxiliary reservoir.

3. In a fluid pressure brake, the combination with an auxiliary reservoir from which fluid is supplied to effect an application of the brakes, of chambers normally charged with fluid under pressure, a valve mechanism controlled by the brake cylinder piston travel for connecting said chambers to the auxiliary reservoir, a supplemental reservoir from which fluid is supplied for recharging the auxiliary reservoir, and means operated upon a reduction in supplemental reservoir pressure by flow to the auxiliary reservoir for cutting off communication from said chambers to the auxiliary reservoir.

4. In a fluid pressure brake, the combination with an auxiliary reservoir from which fluid is supplied to effect an application of the brakes, of chambers normally charged with fluid under pressure, a valve mechanism controlled by the brake cylinder piston travel for connecting said chambers to the auxiliary reservoir, a normally charged supplemental reservoir from which fluid is supplied to the auxiliary reservoir in releasing the brakes, and a valve device operated upon a reduction in supplemental reservoir pressure for cutting off communication from said chambers to the auxiliary reservoir.

5. In a fluid pressure brake, the combination with a brake pipe, auxiliary reservoir, and a valve device subject to the opposing pressures of the brake pipe and auxiliary reservoir for controlling the brakes, of a valve mechanism operated upon an increase in brake cylinder piston travel for cutting additional reservoir volume in with the auxiliary reservoir, a supplemental reservoir from which the auxiliary reservoir is recharged in releasing the brakes, and a valve device controlling communication from said additional reservoir volume to the auxiliary reservoir, and operated upon recharging the auxiliary reservoir from the supplemental reservoir for closing communication from said additional reservoir volume to the auxiliary reservoir.

6. In a fluid pressure brake, the combination with an auxiliary reservoir, of a valve mechanism operated upon an increase in brake cylinder piston travel for cutting additional reservoir volume in with the auxiliary reservoir, a valve device operated in releasing the brakes for cutting off communication from said additional reservoir volume to the auxiliary reservoir and a check valve for preventing back flow from the auxiliary reservoir to said additional reservoir volume.

7. In a fluid pressure brake, the combination with an auxiliary reservoir from which fluid is supplied to effect an application of the brakes, a plurality of normally charged chambers, a valve mechanism operated upon an increase in brake cylinder piston travel for cutting one or more of said chambers into communication with the auxiliary reservoir, and a valve device operated in releasing the brakes for cutting off communication through which fluid is supplied from said chambers to the auxiliary reservoir and for connecting said chambers together.

In testimony whereof I have hereunto set my hand.

WALTER V. TURNER.

Copies of this patent may be obtained for five cents each, by addressing the "Commissioner of Patents, Washington, D. C."